Patented Apr. 12, 1938

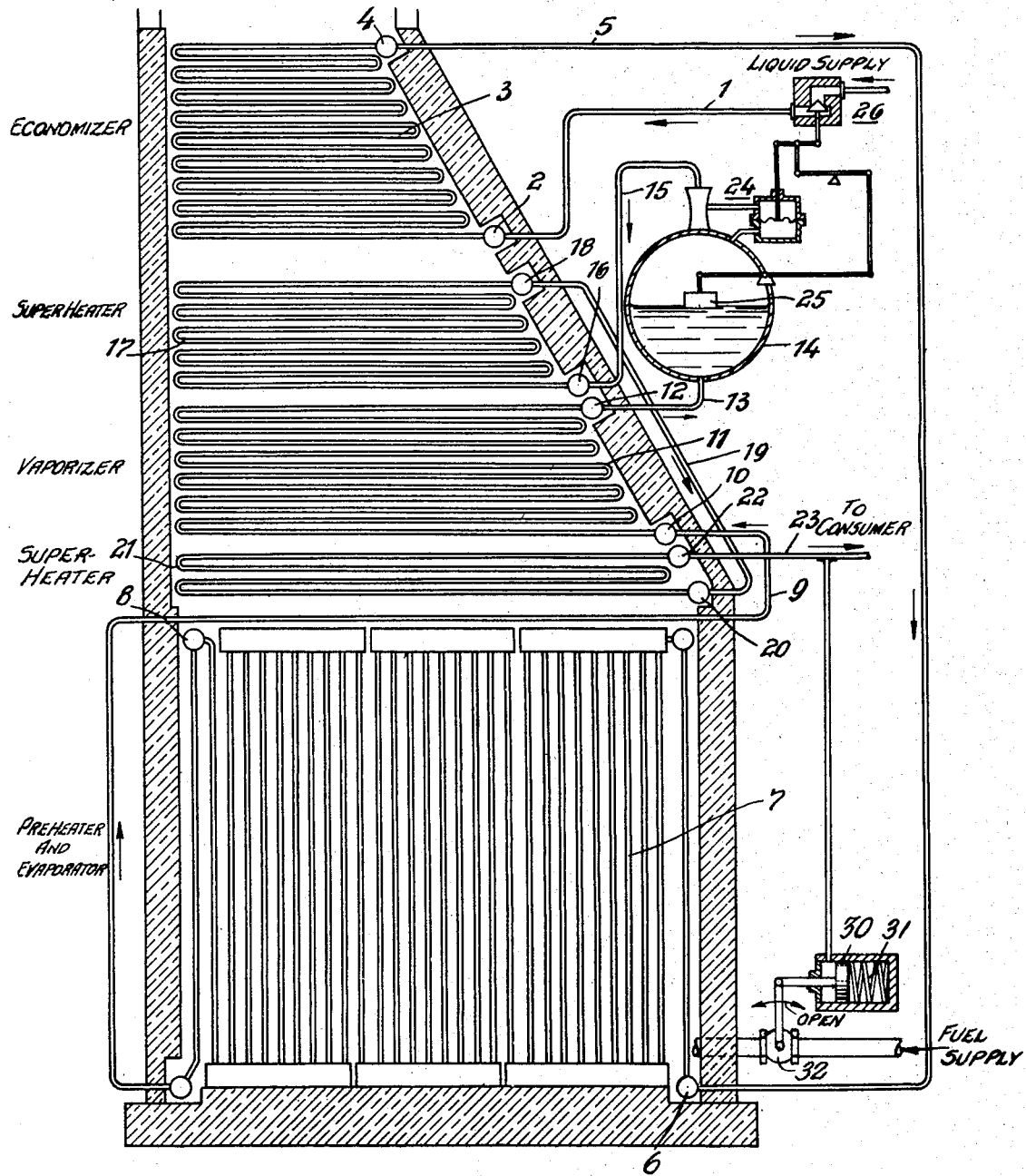

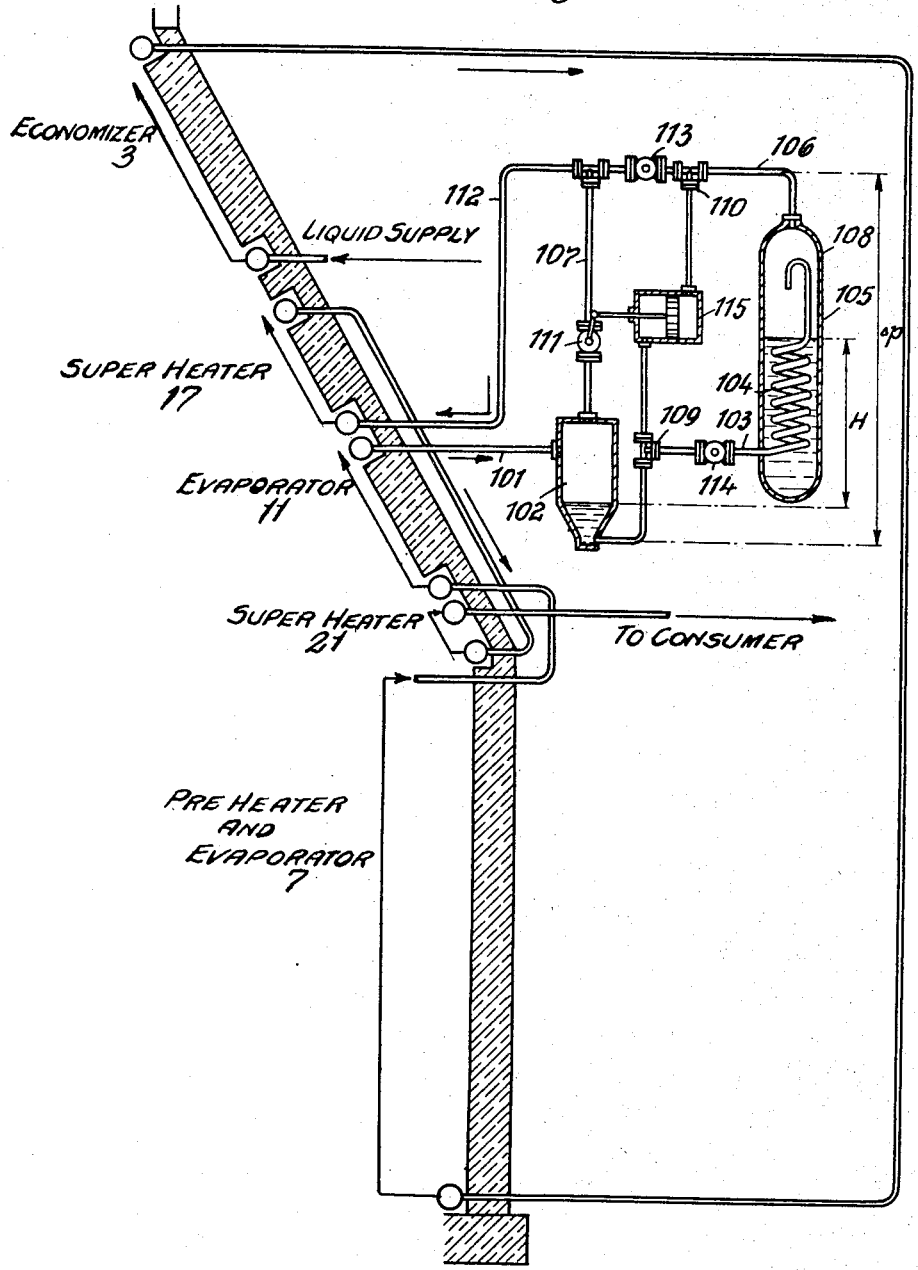

2,113,559

UNITED STATES PATENT OFFICE 2,113,559

STEAM GENERATOR

Wilhelm Abendroth, Berlin-Charlottenburg, Germany, assignor to Siemens-Schuckertwerke Aktiengesellschaft, Berlin-Siemensstadt, Germany, a corporation of Germany Application July 15, 1936, Serial No. 90,636
In Germany July 18, 1935

5 Claims. (Cl. 122—448)

My invention relates to a steam generator in which the operating medium flows on its way from the point at which the liquid is fed to the point at which the steam is drawn off for industrial or other purposes only once over a heating surface formed of tubes and in which only so much liquid is supplied in the unit of time in the state of equilibrium of operation as is necessary to generate the steam required by the consumer. This type of steam generator which I shall designate in the annexed claims as being of the "forced single flow tubular type" has as is well known only a relatively small storing capacity so that a governing apparatus is required which rapidly acts on the supply of fuel and operating medium, if the production of steam is to be effected in accordance with considerably fluctuating demands of steam.

The drawback of the above-mentioned steam-generator may be overcome according to the invention by inserting a drum or the like partly filled with liquid operating medium in the path of flow of the operating medium in such a manner that in the state of equilibrium of operation dry saturated steam enters the liquid or a coil open at one of its ends and located in the liquid, whereas the steam collecting in the space above the liquid is superheated in the heating surface part connected in series with the drum and that upon fluctuations of the liquid level in the drum the normal level is reestablished by correspondingly varying the ratio of the quantity of operating medium fed into the heating surface part connnected in series with the drum to the quantity of heat supplied to the heating surface part. In this manner the drum inserted in the path of flow brings about a state of equilibrium in the case of a fluctuating demand of steam, i. e., the liquid contained therein evaporates upon a sudden increase of demand of steam or in the case of a decrease of demand of steam the drum acts as accumulator. This drum forms a component of the generator and is as above mentioned in operative connection with the governing apparatus of the generator insofar as the liquid level in the drum is brought again to the normal level after decreasing or increasing the quantity of liquid in the drum by varying the state of the steam flowing from the generator to the drum in accordance with the liquid level in the drum. The adjustment of the liquid level in the drum to the normal level coincides in other words, consequently, with the regulation of the boiler. The regulation of the steam generator according to the invention is effected in a very simple manner.

The supply of the feed water is controlled, on the one hand, according to the invention in accordance with the quantity of steam issuing from the drum and, on the other hand, in accordance with the liquid level in the drum, the governing apparatus being so arranged that both control impulses may act without interference on the member controlling the supply of feed water. The control is effected in such a manner that an increase of demand of steam from the drum as well as a lowering of the liquid level in the drum results in an increased supply of the feed water or that conversely in the case of a decreased demand of steam or of an increased liquid content the supply of feed water decreases. In this case, the supply of fuel takes place in accordance with the pressure prevailing at the point of the boiler at which steam is drawn off for general use. The supply of the fuel may also be controlled in accordance with the liquid level in the drum and with the quantity of steam issuing from the latter, whereas the supply of the operating medium may be controlled in accordance with the pressure prevailing at the point of the boiler at which steam is drawn off for general use.

In the accompanying drawings an embodiment of my invention is shown in diagrammatic form. In these drawings Fig. 1 represents a sectional elevation of the steam generator and Fig. 2 represents diagrammatically an arrangement for neutralizing the effect of flow resistance introduced by the equalizer vessel.

As will be seen from Fig. 1 the path of flow of the operating medium may be traced by following the reference numerals 1 to 23. The essential component of the boiler shown is the drum 14 which is filled with liquid operating medium in the state of equilibrium of operation up to a certain normal level. The governing apparatus consists substantially of a quantity measuring device 24 which measures the quantity of steam issuing from the drum 14 and of a float 25 which responds to the variation of the liquid level in the drum 14. The governing apparatus for the supply of the fuel may have any conventional form, such as for instance illustrated in the U. S. Patent No. 1,904,443 to Hans Gleichmann. The control of fuel supply may be effected accordingly in the present case by the control piston 30, spring controlled in cylinder 31, the latter being connected to the consumer's main 23, so that the piston has normally the tendency to close the fuel valve 32 when the pressure in the main 23 drops, and to open it when the pressure rises.

As long as the system is in the state of equilibrium of operation the drum 14 is filled up to its normal level with liquid and the boiler is fired or fed in such a manner that the steam supplied from the pipe 13 and entering the drum is just dry saturated. Since dry saturated steam is also taken from the drum the liquid content of the drum remains, consequently, always unchanged during this operating condition. A disturbance of this equilibrium of operation may either occur by variation from any cause of the ratio of the quantity of water fed into the boiler to the fuel supplied, or by the occurrence of a more or less sudden change in the demand of steam. If the ratio of the quantity of water fed into the boiler to the quantity of fuel supplied varies dry saturated steam will no longer pass through the pipe 13 into the drum 14, but either more or less superheated or wet steam.

In case superheated steam flows through the pipe 13 into the drum 14, the water content of the latter decreases. If the pipe 13, however, supplies wet steam the liquid content will gradually increase. In the first case the float 25 causes the valve 26 located in the feed pipe 1 to open a further amount, whereas in the other case the float 25 effects a further movement of the valve towards the closed position. The above-described regulation effected by the float is further supported by a regulation effected in the same manner by a steam quantity impulse. That is to say, if superheated steam is introduced into the drum 14 instead of saturated steam, the drum supplies an increased amount of steam, whereas if wet steam instead of dry saturated steam is supplied to the drum the latter delivers a smaller amount of steam. As will be apparent from the governing apparatus shown an increase in the supply of steam causes the valve 26 to open further, whereas in the case of a smaller supply of steam the valve 26 is caused to move further towards the closed position. As will be seen, the two impulses act, consequently, in the same sense on the regulating member 26 so that the normal liquid level in the drum 14 is quickly reestablished.

It lies in the nature of this regulation that in the case of any disturbance of the proper ratio of the quantity of the feed water to the quantity of fuel, the ratio which must be maintained for the production of dry saturated steam is always reestablished after a disturbance by adjusting the quantity of liquid fed into the boiler to a corresponding new value. Should the disturbance of the ratio have been caused by a change in the quantity of liquid fed into the boiler this disturbance will be eliminated, whereupon the boiler will, consequently, supply again the same amount of steam which it has also supplied in the former state of equilibrium. If, however, the disturbance has been caused by varying the supply of fuel it may be eliminated by causing the governing apparatus to act upon the feed valve 26, that is to say, not to effect a correction of the supply of fuel. The result is that the delivery of the boiler has varied as soon as the valve 26 has been adjusted after the disturbance in such a manner that the conduit 13 supplies again dry saturated steam. If the demand of steam has not changed in the meantime a change in pressure occurs immediately at the point of the boiler at which steam is drawn off by the consumer. Since the supply of fuel is controlled at 30—32 in accordance with the pressure of the steam supplied to the consumer a correction of the supply of fuel is brought about. Also in this case, as will be apparent, the particular operating factor will be corrected which was the cause of the disturbance of the operating equilibrium; however, if the supply of fuel is to be corrected this correction will be brought about in accordance with the pressure of the steam supplied.

Of particular importance is the behavior of the boiler and the operation of the governing apparatus in case the boiler is operated in the state of equilibrium and the consumption of steam fluctuates. If the demand of steam suddenly increases the following takes place: At the first moment the increased demand of steam causes a decrease in pressure at the point of the boiler at which the steam is drawn off. The supply of fuel which is controlled in accordance with that operating factor increases. With decreasing pressure auxiliary steam is developed from the liquid contained in the drum. This pressure decrease in drum 14 is of course not so extensive and sudden as to cause a violent swelling up of the liquid, but such decrease is rather gradual and progressive during the period of unbalance, so that merely the evaporation of liquid becomes greater than its supply to the drum. The liquid level in the drum therefore drops so that the feed valve 26 will be opened further by the float 25. The increased quantity of steam issuing from the drum causes through the quantity measuring device 24 also a further opening of the valve 26. Consequently, the boiler is not only supplied with an increased amount of fuel but also with an increased amount of feed water so that it will be able to supply also a greater amount of steam. Notwithstanding this fact the state of equilibrium is not yet attained. The liquid level in the drum must first be again adjusted to its normal value and the supply of fuel and of water must be brought into relationship with each other in such a manner that upon the attainment of the normal liquid level in the drum the latter supplies again through the pipe 13 dry saturated steam. The further regulation is now effected in exactly the same manner as in the above-described case in which the ratio of the feed water to the quantity of fuel has been disturbed. Upon a sudden decrease in the demand of steam the regulating operations are carried out in a corresponding reverse manner.

The drum involves for the operating medium a flow resistance of a certain magnitude. When great quantities of steam are needed it may happen that the resistance to flow attains such a high value that the steam generator is not able to supply the desired quantity of steam. Another object of my invention is to provide an arrangement, whereby the above-mentioned drawback is overcome. This may be accomplished according to the invention by arranging the drum in parallel relation with a regulable tubular part which permits a direct connection of the evaporating portion with the superheating portion. The sum of the quantities of steam flowing through the drum and the parallel-connected pipe may be then so adjusted that the consuming apparatus always receives the desired quantity of steam without the supply of steam from the boiler being impaired in any way by the resistance of the drum.

That particular feature of the invention is shown in Fig. 2 in diagrammatic form. The steam generator there indicated may be in its other structural features similar to the one shown in Fig. 1. The liquid operating medium is supplied by a pump (not shown) to the economizer 3 (see also Fig. 1) which is located in the heat convection zone of the boiler, and in which the medium is preheated. From there it passes into the tube section 7, which is located in the heat radiating zone and which is partly still used for preheating the liquid. Only in the last portion of section 7 the evaporation commences. From there the medium flows into the principal evaporator 11 which is located in the heat convection zone. From this evaporator the then completely vaporous medium flows through pipe 101 to the control system to be described hereinafter. The pipe 112 thence conducts the operating medium to the superheater 17 and 21 to which the pipe of the consuming apparatus is connected, and which lies in the heat convection zone.

The pipe 101 connected behind the zone of evaporation feeds steam into the coil 104 within the drum 108 through the valve 114 and the pipe 103. The steam entering the coil 104 is dry saturated as well as the steam flowing from the drum to the pipe 112 through the pipe 106. The boiler is regulated according to the water level 105 in the auxiliary drum 108 in the manner shown in Fig. 1. It should be noted that by the term "drum" not the structural part of an ordinary drum boiler is to be understood but that a structural part is involved which is rather to be considered as an auxiliary element for establishing an artificial water level.

In order to produce a sufficient quantity of steam in the case of a great demand of steam by the consuming apparatus the pipe 101 is connected to the pipe 112 through the pipe 107, i. e., a direct connection between the evaporator 11 and superheater 17 is established in parallel relation to the drum 108. The connection itself is regulable by a valve 111 which is adjusted by hand or as hereinafter described automatically. If the drop in pressure $\Delta p$ in the drum 108 is so great as not to permit the passage of sufficient steam therethrough the valve 111 is opened to such an extent that the remaining part of steam may pass through pipe 112 directly to the superheater through the parallel-connected pipe 107. The total quantity of steam flowing to the superheater consists, consequently, of two quantities which flow in parallel relation with each other into the pipe 112 through the drum 108 and the pipe 107. For automatically controlling the valve 111, for instance a pressure differential responsive piston device 115 may be employed which is influenced, on the one hand, by the pressure prevailing in the pipe 106 and effective at the point 110 from which the impulse is transmitted to one side of the piston of device 115 and, on the other hand, by the pressure prevailing in the conduit 103 and effective at the point 109 from which the impulse is transmitted to the other side of the piston of device 115. With a given quantity of steam consumption the valve 111 begins, therefore, to open and moves more and more toward the open position the more the steam demand increases.

If the operating conditions of the boiler should cause the steam issuing from the pipe 101 to become wet, the moisture might under certain circumstances reach the superheater, which may as is well known give rise to trouble and cause a deposit of sedimentary salts. It is, therefore, preferable to insert a water separator 102 at the junction of pipes 101 and 107. The water collecting in this separator is then forced into the drum 108.

If, however, the steam flowing through the pipe 101 is already superheated owing to the prevailing operating conditions of the boiler, also the drum 108 receives superheated steam which partly evaporates the liquid content of the drum. This must be taken into consideration when regulating the boiler.

I claim as my invention:

1. In a steam generator of the forced single flow tubular type having means for normally supplying amounts of operating and heating medium per unit of time at a ratio commensurate with the normal steam consumption per time unit, a liquid storage container interposed into the flow circuit and restricted to exclusively receive operating medium directly from and discharge it exclusively into said circuit, and being partly filled with liquid operating medium to a desired normal level, means for normally supplying dry saturated steam through said liquid into the top of said container whereby neither evaporation by superheated steam nor increase of said liquid through condensation of wet steam occurs during normal operation, means for superheating the steam discharged from said container, and means responsive to the variation of the normal liquid level in said container, due to the supply of superheated or wet steam in case of under or overload respectively, for varying the normal ratio of operating liquid and fuel supply to reestablish the normal liquid level in said container.

2. In a steam generator of the forced single flow tubular type having means for normally supplying amounts of operating and heating medium per unit of time at a ratio commensurate with the normal steam consumption per time unit, a liquid storage container interposed into the flow circuit and restricted to exclusively receive operating medium directly from and discharge it into said circuit, and being partly filled with liquid operating medium to a desired normal level, means for normally supplying dry saturated steam to said liquid whereby neither evaporation nor increase of said liquid through condensation occurs during normal operation, means for superheating the steam discharged from said container, and means responsive to the variation of the normal liquid level in said container, due to the supply of superheated or wet steam in case of under or overload respectively, for varying the amount of operating liquid supply to the generator and means for controlling the fuel supply inversely to the pressure of the steam delivered from the generator, for varying the normal ratio of operating liquid and fuel supply in accordance with the newly prevailing operating conditions and to reestablish the normal liquid level in said container.

3. In a steam generator of the forced single flow tubular type having means for normally supplying amounts of operating and heating medium per unit of time at a ratio commensurate with the normal steam consumption per time unit, a liquid storage container interposed into the flow circuit and restricted to exclusively receive operating medium directly from and discharge it into said circuit, and being partly filled with liquid operating medium to a desired normal level, means for normally supplying dry saturated steam to said liquid whereby neither evaporation nor increase of said liquid through condensation occurs during normal operation, means for superheating the steam discharged from said container, means responsive to the quantity of steam issuing from said container and means responsive to the variation of the normal liquid level in said container, due to the supply of superheated or wet steam in case of under or overload respectively, for varying the normal ratio of operating liquid and fuel supply to reestablish the normal liquid level in said container.

4. In a steam generator of the forced single flow tubular type having means for normally supplying amounts of operating and heating medium per unit of time at a ratio commensurate with the normal steam consumption per time unit, a liquid storage container interposed into the flow circuit and restricted to exclusively receive operating medium directly from and discharge it into said circuit, and being partly filled with liquid operating medium to a desired normal level, means for normally supplying dry saturated steam to said liquid whereby neither evaporation nor increase of said liquid through condensation occurs during normal operation, means for superheating the steam discharged from said container, and means responsive to the variation of the normal liquid level in said container, due to the supply of superheated or wet steam in case of under or overload respectively, for varying the normal ratio of operating liquid and fuel supply to reestablish the normal liquid level in said container and a steam by-pass between the steam input and output side of said container and means for controlling the amount of said by-pass.

5. In a steam generator of the forced single flow tubular type having means for normally supplying amounts of operating and heating medium per unit of time at a ratio commensurate with the normal steam consumption per time unit, a liquid storage container interposed into the flow circuit and restricted to exclusively receive operating medium directly from and discharge it into said circuit, and being partly filled with liquid operating medium to a desired normal level, means for normally supplying dry saturated steam to said liquid whereby neither evaporation nor increase of said liquid through condensation occurs during normal operation, means for superheating the steam discharged from said container, and means responsive to the variation of the normal liquid level in said container, due to the supply of superheated or wet steam in case of under or overload respectively, for varying the normal ratio of operating liquid and fuel supply to reestablish the normal liquid level in said container, and a steam by-pass between the steam input and output side of said container and means responsive to the pressure difference between said two sides for controlling the amount of said steam by-pass.

WILHELM ABENDROTH.